L. A. WILLIAMS.
MEANS FOR ELECTROPLATING PIPE, &c.
APPLICATION FILED JUNE 19, 1908.
951,265.
Patented Mar. 8, 1910.
3 SHEETS—SHEET 1.
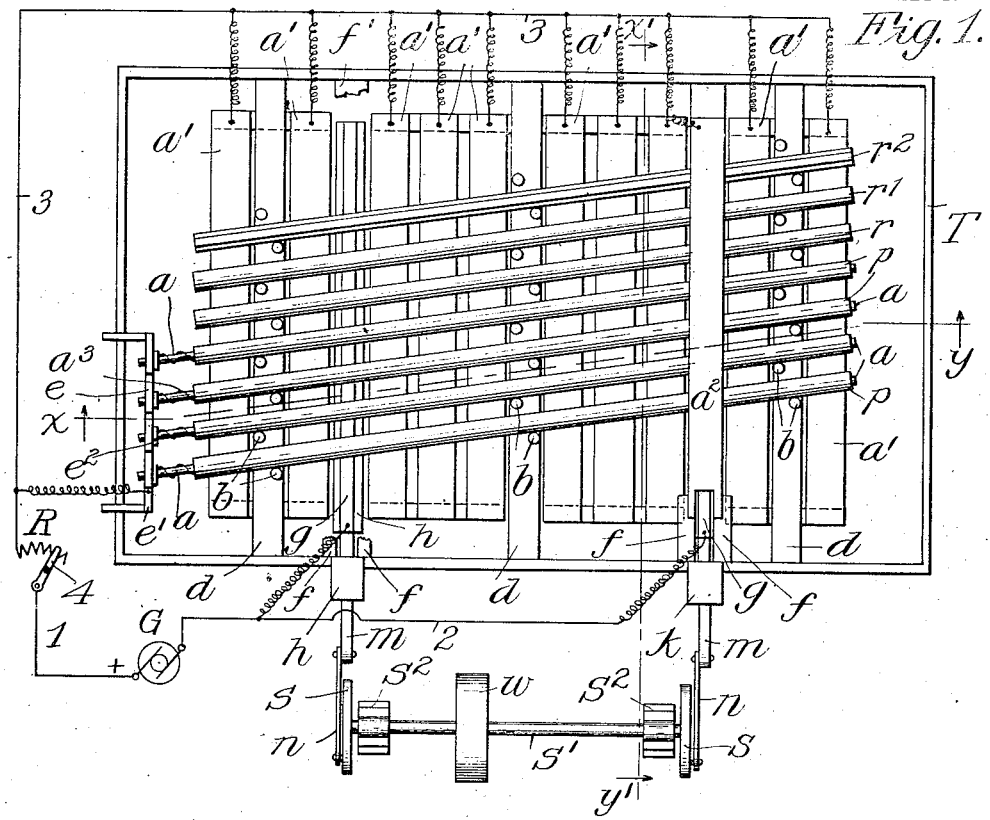
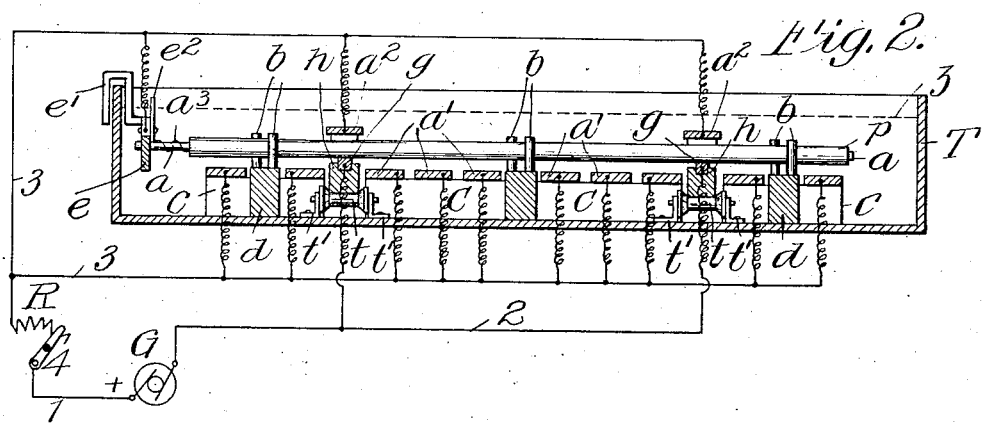
Witnesses
Geo. C. Higham
Leonard W. Novander
Inventor
Lynn A. Williams
By Brown & Williams
Attorneys

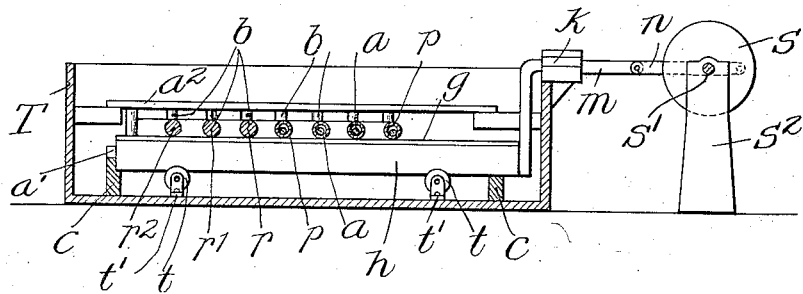
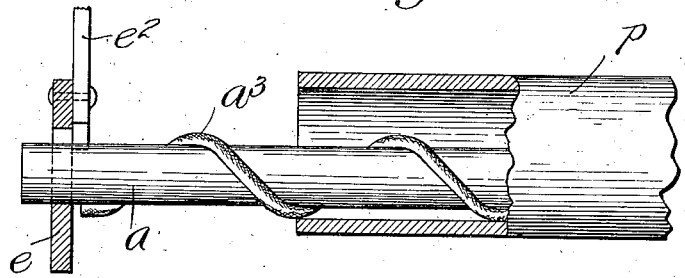
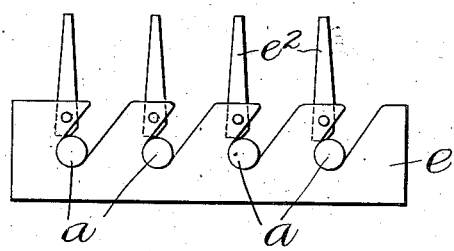

L. A. WILLIAMS.
MEANS FOR ELECTROPLATING PIPE, &c.
APPLICATION FILED JUNE 19, 1908.

951,265. Patented Mar. 8, 1910.

3 SHEETS—SHEET 3.

Witnesses
George S. Higham.
Leonard W. Novander.

Inventor
Lynn A. Williams
By Brown & Williams
Attorneys

UNITED STATES PATENT OFFICE.

LYNN A. WILLIAMS, OF EVANSTON, ILLINOIS, ASSIGNOR TO DANIEL HAYES MURPHY, OF NEW CASTLE, PENNSYLVANIA.

MEANS FOR ELECTROPLATING PIPE, &c.

951,265.

Specification of Letters Patent.

Patented Mar. 8, 1910.

Application filed June 19, 1908. Serial No. 439,323.

*To all whom it may concern:*

Be it known that I, LYNN A. WILLIAMS, a citizen of the United States, residing at Evanston, in the county of Cook and State of Illinois, have invented new and Improved Means for Electroplating Pipe, &c., of which the following is a specification.

My invention relates to apparatus for electroplating rod or pipe, and has for its object the simplification of the mechanism required for this purpose, and I also secure by my improved apparatus results not heretofore attained.

In the past it has been customary to place the rods or pipe to be plated in a suitable tank for containing the electroplating solution, and to move the rods or pipe either continuously or reciprocally in the solution, and to use auxiliary apparatus for preventing the unequal deposit of the material used in the plating operation upon different portions of the rod or pipe.

By my invention I make use of the means used for imparting motion to the rods or pipe in the tank to displace them in two directions, as a result of which the auxiliary apparatus heretofore used for securing this result is dispensed with.

In the preferred embodiment of my invention I impart to the rods or pipe when in place in the plating tank a reciprocating motion adapted to reciprocally rotate the rods or pipe, and I employ means for preventing or limiting lateral motion of the rods or pipe in the plating solution.

By my invention, the rods or pipe, the means used to impart reciprocating motion to the rods or pipe, and the means used to prevent or limit lateral displacement of the rods or pipe in the tank, coöperating in such a manner as to produce reciprocating longitudinal motion of the rods or pipe in the plating tank as a direct result of the reciprocating motion communicated to the rods or pipe, and without the use of any additional apparatus.

Figure 6:
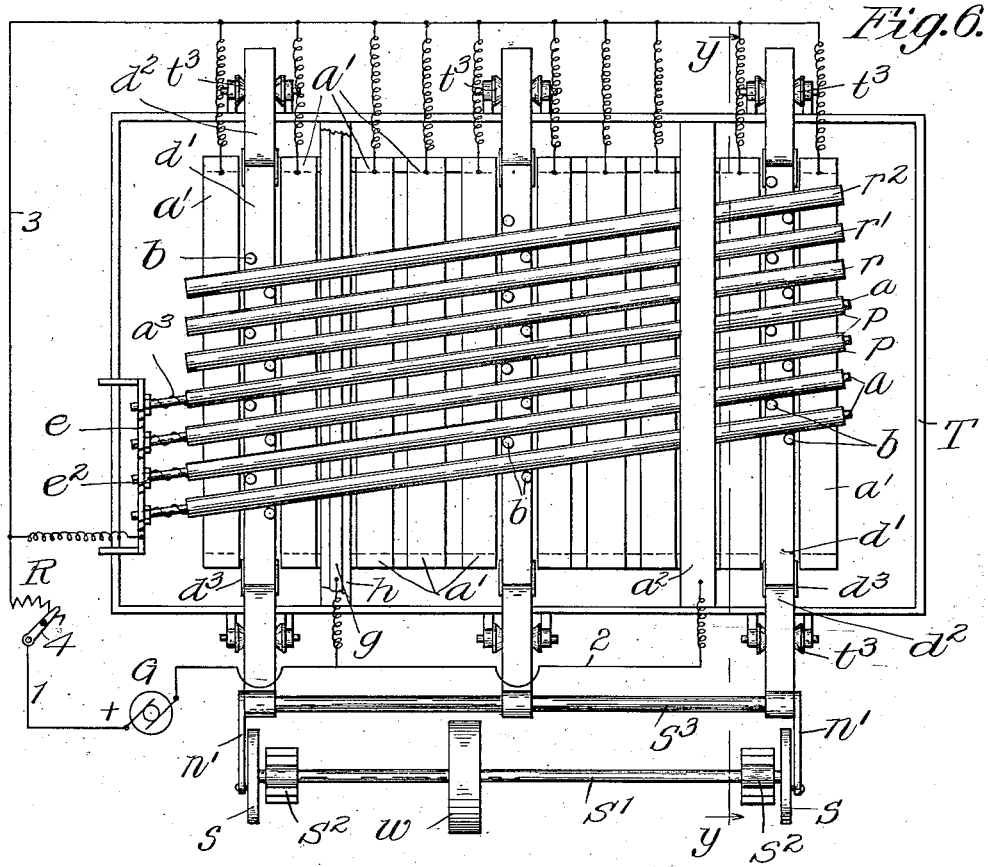
Figure 7:
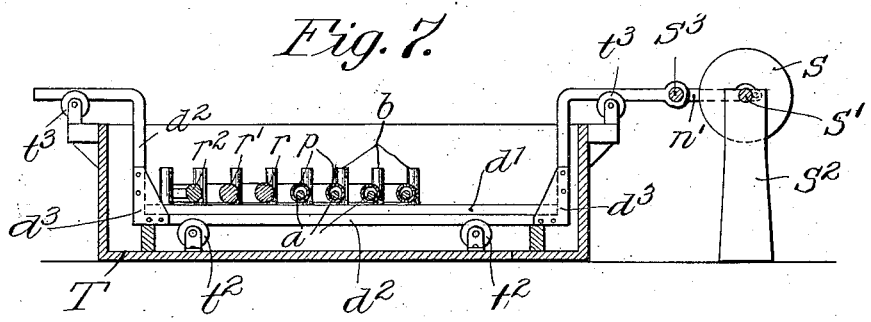

The several drawings illustrating my invention are as follows:

Figure 1 is a top view of a plating tank containing apparatus for supporting the rods or pipe in proper position to be plated, as well as the mechanism employed to equalize the deposit on the surface of the rods or pipe; Fig. 2 is a sectional view of the parts shown in Fig. 1, taken along the dotted line $x$—$y$; Fig. 3 is a sectional view taken along the line $x^1$—$y^1$ of the parts shown in Fig. 1; Fig. 4 is an enlarged detail view of the pipe and internal anode, showing the means employed for securing the terminal of the electric circuit to the internal anodes and for preventing longitudinal motion of such internal anodes; Fig. 5 shows in end view the clamping member used to engage the internal anodes shown in Fig. 4; and Figs. 6 and 7 show, in views similar to Figs. 1 and 3, a modified form of apparatus in accordance with my invention.

Similar characters refer to similar parts throughout the several views.

Referring to the drawings,—T is a tank for holding the electrolyte used in the operation, the upper surface of this electrolyte being indicated by the dotted line $z$ in Fig. 2. In this electrolyte, conductors $g$ incased on all except the upper surfaces by supporting and insulating bars $h$ are adapted to move transversely of the tank upon suitable rollers $t$ supported by brackets $t^1$ from the tank T. These conductors $g$ and the bars attached to them are secured at one end to bent bars $m$ slidably supported in bearings $k$ from the tank T, and are engaged at their outer ends by connecting rods $n$, which serve to communicate motion to such bent bars from crank disks $s$ supported by shaft $s^1$ in suitable bearings $s^2$. This shaft $s^1$ may be driven by any suitable means, as pulley $w$, in a manner not indicated. The conductors $g$ are adapted to support the rods $r$—$r^1$—$r^2$ and the pipe $p$ that it is desired to plate. Pins $b$ of insulating material, preferably of wood, are located between the several rods and pipe, and are supported from the cross bars $d$ secured to the bottom of the tank T. The rods and pipe are so disposed on the conductors $g$ and between the pins $b$ as to occupy an oblique position relatively to the supporting conductors $g$. As a result of the construction just described, it will be observed that when the shaft $s^1$ is rotated the conductors $g$ will be moved back and forth and tend to carry the rods and pipe supported thereon with them, but since this motion is opposed by the pins $b$, the result is to rotate these rods and pipe with practically no lateral displacement of the same in the tank T. As a result of the oblique inclination of the rods and pipe relatively to the conductors $g$, a further result of the reciprocating motion imparted to the conductors $g$ is a slight longitudinal motion of the rods and pipe upon the conductors $g$ as such rods and pipe are rotated. As a result of this longitudinal motion, the pins $b$ and the conductors $g$ are caused to make contact with the pipe at different portions of its length, thus providing that the plating operation may take place at all points on the surface of the rods or pipe, and thus not be interfered with by the contact between the pins $b$ or the conductors $g$ and the rods and pipe.

Suitable anodes $a^1$ are disposed beneath the rods and pipe to be plated, and are supported in proper position in the electrolyte by means of blocks $c$ from the bottom of the tank T. In order to plate the portion of the pipe engaged by the conductors $g$, anodes $a^2$ are disposed in the electrolyte above the pipe and above the conductors $g$. To effect the plating of the inside of the pipe, internal anodes $a$ are used, extending from one end of the pipe to the other and rigidly secured as indicated at $e$ to one terminal of the circuit used for supplying the current required. This securing means is more clearly indicated in Figs. 4 and 5, and consists, as indicated, in eccentrically pivoted levers $e^2$ adapted to clamp the electrodes $a$ firmly in contact with the common bar $e$. In order to prevent the internal anodes $a$ from making electrical contact with the pipe $p$, a strip of insulation, as $a^3$, consisting of twine, india rubber or similar substance, is spirally wound around such anodes and secured thereto in any desired manner, not shown. As indicated in Figs. 1 and 2, the bar $e$ is prevented from moving longitudinally of the tank by the projections $e^1$ secured to the ends of the bar $e$ and adapted to engage the end of the tank T. As a result of this construction, the longitudinal motion of the pipe above referred to results in a longitudinal displacement of the internal anodes relatively to such pipe.

G represents a generator for furnishing current, the circuit from which is as follows: beginning at the positive terminal of such generator, through the conductor 1, switch 4, regulating resistance R, positive bus bars 3, to the several anodes $a$—$a^1$—$a^2$, through the electrolyte to the pipe, thence to the conductors $g$, and returning by negative bus bar 2 to the generator.

In the modification shown in Figs. 6 and 7, the apparatus is similar to that already described, with the exception that the conductors $g$ are rigidly supported from the plating tank T, while the pins $b$ are supported in such a manner that they may be moved reciprocally in a direction laterally of the rods or pipe supported by the conductors $g$. In this modification the pins $b$ are secured to a bar $d^1$, which in turn is carried by a frame $d^2$ supported by rollers $t^2$ and $t^3$ from the bottom and sides of the tank T. The bars $d^1$ are held in place on the frames $d^2$ by retaining members $d^3$, which also serve to stiffen the frames $d^2$. In this modification the frames $d^2$ are connected together at their outer ends by a rod $s^3$ connected by connecting rods $n^1$ with the crank disks $s$. As the pulley $w$ is rotated, the bars $d^1$ are moved reciprocally and laterally of the tank T, as a result of which, since the rods and pipe are resting upon the fixed conductors $g$, rotation is reciprocally imparted to the rods and pipe, and since these rods and pipe are obliquely disposed relative to the conductors $g$, as described above, a reciprocating longitudinal motion is also imparted to the rods and pipe in a manner substantially the same as that described in connection with the other modification. While I have shown the frames $d^2$ as supported by rollers both inside and outside of the tank, it is to be understood that if, for any reason, it were desirable to dispense either with the inside or the outside supports, this might be done, although I find it preferable to support the frames as indicated.

While I have shown my invention in the particular embodiment herein described, I do not, however, limit myself to this construction, but may employ any equivalent construction that will suggest itself to those skilled in the art.

What I claim is:

1. As a means for electroplating rods or pipe, a tank and an electrolyte therein, an anode in such electrolyte, a source of electric energy, means for supporting the rods or pipe in such electrolyte, a circuit from such source through such anode, such electrolyte and the rods or pipe, and means for rotating the rods or pipe without displacing them laterally relatively to such tank, such rotating means constituting a means for moving the rods or pipe longitudinally in the tank.

2. As a means for electroplating rods or pipe, a tank and an electrolyte therein, an anode in such electrolyte, a source of electric energy, means for supporting the rods or pipe in such electrolyte, a circuit from such source through such anode, such electrolyte and the rods or pipe, and means for reciprocally rotating the rods or pipe without displacing them laterally relatively to such tank, such rotating means constituting a means for moving the rods or pipe longitudinally in the tank.

3. As a means for electroplating rods or pipe, a tank and an electrolyte therein, an anode in such electrolyte, a source of electric energy, means for supporting the rods or pipe in such electrolyte, means for preventing lateral motion of the rods or pipe in such tank, a circuit from such source through such anode, such electrolyte and the rods or pipe, and means for rotating the rods or pipe, such rotating means constituting a means for moving the rods or pipe longitudinally in the tank.

4. As a means for electroplating rods or pipe, a tank and an electrolyte therein, an anode in such electrolyte, a source of electric energy, conductors for supporting the rods or pipe in such electrolyte, means for preventing lateral motion of the rods or pipe in such tank, a circuit from such source through such anode, such electrolyte, the rods or pipe and such conductors, and means for moving such conductors, such conductors constituting a means for moving the rods or pipe longitudinally in the tank.

5. As a means for electroplating rods or pipe, a tank and an electrolyte therein, an anode in such electrolyte, a source of electric energy, conductors for supporting the rods or pipe in such electrolyte, stops for limiting the lateral motion of the rods or pipe in the tank, a circuit from such source through such anode, such electrolyte, the rods or pipe and such conductors, and means for producing a relative motion between such conductors and such stops, such relative motion resulting in a longitudinal motion of the rods or pipe in the tank.

6. As a means for electroplating rods or pipe, a tank and an electrolyte therein, an anode in such electrolyte, a source of electric energy, conductors for supporting the rods or pipe in such electrolyte, a circuit from such source through such anode, such electrolyte, the rods or pipe and such conductors, means for reciprocally moving such conductors laterally of the rods or pipe, and means for preventing lateral displacement of the rods or pipe, such preventing means causing the rods or pipe to rotate as such conductors are moved reciprocally, such conductors and such preventing means together constituting means for moving the rods or pipe longitudinally in the tank.

7. As a means for electroplating rods or pipe, a tank and an electrolyte therein, an anode in such electrolyte, a source of electric energy, conductors for supporting the rods or pipe in such electrolyte, a circuit from such source through such anode, such electrolyte, the rods or pipe and such conductors, stops for limiting the lateral motion of the rods or pipe in the tank, and means for producing a relative reciprocating motion between such conductors and such stops, such relative motion resulting in a longitudinal motion of the rods or pipe in the tank.

8. As a means for electroplating pipe, a tank and an electrolyte therein, an anode adapted to be contained within the pipe in such electrolyte, a source of electric energy, means for supporting the pipe in such electrolyte, a circuit from such source through such anode, such electrolyte and the pipe, means for preventing contact between such anode and the pipe, and means for rotating the pipe relatively to such anode, such rotating means constituting a means for moving the pipe longitudinally relatively to such internal anode.

9. As a means for electroplating pipe, a tank and an electrolyte therein containing the material to be deposited, a conducting anode of another material than that contained in such electrolyte and adapted to be contained within the pipe in such electrolyte, a source of electric energy, means for supporting the pipe in such electrolyte, a circuit from such source through such anode, such electrolyte and the pipe, means for preventing electrical contact between such anode and the pipe, and means for rotating the pipe relatively to such anode, such anode serving to equalize the deposit upon the pipe, such rotating means constituting a means for moving the pipe longitudinally relatively to such internal anode.

10. As a means for electroplating pipe, a tank and an electrolyte therein containing the material to be deposited, a conducting anode of another material than that contained in such electrolyte and adapted to be contained within the pipe in such electrolyte, a source of electric energy, means for supporting the pipe in such electrolyte, a circuit from such source through such anode, such electrolyte and the pipe, means for preventing electrical contact between such anode and the pipe, means for rotating the pipe relatively to such anode, such anode serving to equalize the deposit upon the pipe, and detachable means for rigidly securing such anode to a conductor of such circuit, such rotating means constituting a means for moving the pipe longitudinally relatively to such internal anode.

11. As a means for electroplating pipe, a tank and an electrolyte therein, an anode adapted to be contained within the pipe in such electrolyte, an anode in such electrolyte outside of the pipe, a source of electric energy, means for supporting the pipe in such electrolyte, a circuit from such source through such anodes, such electrolyte and the pipe, and means for rotating the pipe relatively to such internal anode, such rotating means constituting a means for moving the pipe longitudinally relatively to such internal anode.

12. As a means for electroplating pipe, a tank and an electrolyte therein, an anode adapted to be contained within the pipe in such electrolyte, an anode in such electrolyte outside of the pipe, a source of electric energy, conductors for supporting the pipe in such electrolyte, a circuit from such source through such anodes, such electrolyte, the pipe and such conductors, means for reciprocally moving such conductors laterally of the pipe, and means for preventing lateral motion of the pipe in such tank whereby the motion of such conductors rotates the pipe, such conductors and such preventing means constituting a means for moving the pipe longitudinally in the tank.

13. As a means for electroplating pipe, a tank and an electrolyte therein, an anode adapted to be contained within the pipe in such electrolyte, an anode in such electrolyte outside of the pipe, a source of electric energy, conductors for supporting the pipe in such electrolyte, a circuit from such source through such conductors, such electrolyte, the pipe and such conductors, means for reciprocally moving such conductors laterally of the pipe, stops for limiting the lateral motion of the pipe in the tank, and means for producing a relative rotation between such conductors and such stops, such relative motion resulting in a longitudinal motion of the pipe in the tank.

14. As a means for electroplating rods or pipe, a tank and an electrolyte therein, an anode in such electrolyte, a source of electric energy, means obliquely disposed relatively to the rods or pipe for supporting them in such electrolyte, a circuit from such source through such anode, such electrolyte and the rods or pipe, and means for rotating the rods or pipe without displacing them laterally relatively to such tank, such supporting means constituting a means for moving the rods or pipe longitudinally in the tank.

15. As a means for electroplating rods or pipe, a tank and an electrolyte therein, an anode in such electrolyte, a source of electric energy, means obliquely disposed relatively to the rods or pipe for supporting them in such electrolyte, means for preventing lateral motion of the rods or pipe in such tank, a circuit from such source through such anode, such electrolyte and the rods or pipe, and means for rotating the rods or pipe, such supporting means constituting a means for moving the rods or pipe longitudinally in the tank.

16. As a means for electroplating rods or pipe, a tank and an electrolyte therein, an anode in such electrolyte, a source of electric energy, conductors obliquely disposed relatively to the rods or pipe for supporting them in such electrolyte, means for preventing lateral motion of the rods or pipe in such tank, a circuit from such source through such anode, such electrolyte, the rods or pipe and such conductors, and means for moving such conductors, such conductors constituting a means for moving the rods or pipe longitudinally in the tank.

17. As a means for electroplating rods or pipe, a tank and an electrolyte therein, an anode in such electrolyte, a source of electric energy, conductors obliquely disposed relatively to the rods or pipe for supporting them in such electrolyte, stops for limiting the lateral motion of the rods or pipe in the tank, a circuit from such source through such anode, such electrolyte, the rods or pipe and such conductors, and means for producing a relative motion between such conductors and such stops, such conductors and such stops together constituting a means for moving the rods or pipe longitudinally in the tank.

18. As a means for electroplating rods or pipe, a tank and an electrolyte therein, an anode in such electrolyte, a source of electric energy, conductors obliquely disposed relatively to the rods or pipe for supporting them in such electrolyte, a circuit from such source through such anode, such electrolyte, the rods or pipe and such conductors, means for reciprocally moving such conductors laterally of the rods or pipe, and means for preventing lateral displacement of the rods or pipe, such preventing means causing the rods or pipe to rotate as such conductors are moved reciprocally, such conductors and such preventing means together constituting a means for moving the rods or pipe longitudinally in the tank.

19. As a means for electroplating rods or pipe, a tank and an electrolyte therein, an anode in such electrolyte, a source of electric energy, conductors obliquely disposed relatively to the rods or pipe for supporting them in such electrolyte, a circuit from such source through such anode, such electrolyte, the rods or pipe and such conductors, stops for limiting the lateral motion of the rods or pipe in the tank, and means for producing a relative reciprocating motion between such conductors and such stops, such stops causing the rods or pipe to rotate as such conductors are moved reciprocally, such conductors and such stops together constituting a means for reciprocally moving the rods or pipe longitudinally in the tank.

20. As a means for electroplating pipe, a tank and an electrolyte therein, an anode adapted to be contained within the pipe in such electrolyte, a source of electric energy, means obliquely disposed relatively to the pipe for supporting them in such electrolyte, a circuit from such source through such anode, such electrolyte and the pipe, means for preventing contact between such anode and the pipe, and means for rotating the pipe relatively to such anode, such supporting means constituting a means for moving the pipe longitudinally in the tank.

21. As a means for electroplating pipe, a tank and an electrolyte therein, an anode adapted to be contained within the pipe in such electrolyte, an anode in such electrolyte outside of the pipe, a source of electric energy, conductors obliquely disposed relatively to the pipe for supporting them in such electrolyte, a circuit from such source through such anodes, such electrolyte, the pipe and such conductors, means for reciprocally moving such conductors laterally of the pipe, and means for preventing lateral motion of the pipe in such tank whereby the motion of such conductors rotates the pipe, such conductors and such preventing means together constituting a means for moving the pipe longitudinally in the tank.

22. As a means for electroplating pipe, a tank and an electrolyte therein, an anode adapted to be contained within the pipe in said electrolyte, an anode in such electrolyte outside of the pipe, a source of electric energy, conductors obliquely disposed relatively to the pipe for supporting them in such electrolyte, a circuit from such source through such anodes, such electrolyte, the pipe and such conductors, stops for limiting the lateral motion of the pipe in the tank, and means for producing a relative reciprocating motion between such conductors and such stops whereby the pipe are rotated, such conductors and such stops together constituting a means for reciprocally moving the pipe longitudinally in the tank.

23. As a means for equalizing the thickness of plating electrolytically deposited upon rods or pipe, means for supporting the rods or pipe in the plating solution, and a common means for simultaneously rotating the rods or pipe and moving them longitudinally in the solution.

24. As a means for equalizing the thickness of plating electrolytically deposited upon rods or pipe, means obliquely disposed relatively to the rods or pipe for supporting them in the plating solution, and a common means for simultaneously rotating the rods or pipe and moving them longitudinally in the solution.

25. As a means for equalizing the thickness of plating electrolytically deposited upon rods or pipe, means obliquely disposed relatively to the rods or pipe for supporting them in the plating solution, and a common means for simultaneously rotating the rods or pipe reciprocally and moving them longitudinally in the solution.

26. As a means for equalizing the thickness of plating electrolytically deposited upon rods or pipe, means obliquely disposed relatively to the rods or pipe for supporting them in the plating solution, and means for rotating such rods or pipe on such supports, the obliquity of such supports serving to impart longitudinal motion to such rods or pipe as they are rotated.

27. As a means for equalizing the thickness of plating electrolytically deposited upon rods or pipe, means obliquely disposed relatively to the rods or pipe for supporting them in the plating solution, and means for reciprocally rotating such rods or pipe on such supports, the obliquity of such supports serving to impart a reciprocating longitudinal motion to such rods or pipe as they are rotated.

28. As a means for electroplating rods or pipe, a tank containing a plating solution, conductors located laterally across the bottom of such tank for supporting the rods or pipe obliquely thereon in the plating solution, anodes of the material to be deposited located in the solution beneath the rods or pipe, a circuit from a source of electric energy through such anodes, solution and such rods or pipe, means for reciprocating such conductors consisting in connecting rods, cranks and a driving shaft associated therewith, stops supported by the tank for limiting the lateral motion of the rods or pipe in the solution, the oblique arrangement of the rods or pipe serving to impart thereto a reciprocating longitudinal motion as the supporting conductors are reciprocated.

29. As a means for electroplating pipe, a tank containing a plating solution, conductors supported laterally of the tank and adapted in turn to support the pipe obliquely thereon in the solution, internal anodes of a material other than that to be deposited located in the pipe in the solution, means for preventing electrical contact between the anodes and the pipe, removable means for preventing rotation of the internal anodes, means for preventing longitudinal motion of the internal anodes, a circuit from a source of electric energy through such anodes, solution and such pipe, means for reciprocating such conductors consisting in connecting rods, cranks and a driving shaft associated therewith, stops supported by the tank for limiting the lateral motion of the pipe in the solution, the oblique arrangement of the pipe serving to impart thereto a reciprocating longitudinal motion relatively to the internal anodes as the supporting conductors are reciprocated.

30. As a means for electroplating pipe, a tank containing a plating solution, lateral conductors supported from the bottom of the tank and supporting obliquely thereon in turn in the solution the pipe to be plated, anodes of the material to be deposited located in the solution below the pipe, internal anodes of another material than that to be deposited located in the pipe in the solution, insulating means surrounding the internal anodes to prevent electrical contact between such anodes and the pipe, external anodes of the material to be deposited located in the solution over the lateral conductors and the pipe, a circuit from a source of electric energy through such anodes, solution, pipe and such conductors, means for reciprocating such conductors consisting in connecting rods, cranks and a driving shaft associated therewith, stops supported by the tank for limiting the lateral motion of the pipe in the solution and for separating the pipe from each other, the oblique arrangement of the pipe serving to impart thereto a reciprocating longitudinal motion relatively to the internal anodes and to the tank as the supporting conductors are reciprocated.

31. As a means for electroplating rods or pipe, a tank and an electrolyte therein, an anode in such electrolyte, a source of electric energy, means for supporting the rods or pipe in such electrolyte, a circuit from such source through such anode, such electrolyte and the rods or pipe, and common means for rotating the rods or pipe and moving the same longitudinally in the tank.

32. As a means for electroplating rods or pipe, a tank and an electrolyte therein, a source of electric energy, means for supporting the rods or pipe in such electrolyte, a circuit from such source through said anode, such electrolyte and the rods or pipe, and means for rotating the rods or pipe and for moving the same longitudinally in the tank without displacing them laterally.

33. As a means for electroplating rods or pipe, a tank and an electrolyte therein, means for supporting the rods or pipe in such electrolyte, and means for moving the rods or pipe longitudinally in the tank by rotating them.

In witness whereof, I hereunto subscribe my name, this 16th day of June, A. D. 1908.

LYNN A. WILLIAMS.

Witnesses:
LEONARD W. NOVANDER,
JOHN C. MICHAEL.